(No Model.) 2 Sheets—Sheet 1.

F. G. STONE & W. R. WALTON.
METHOD OF TESTING METALLIC TUBES.

No. 324,495. Patented Aug. 18, 1885.

(No Model.) 2 Sheets—Sheet 2.

F. G. STONE & W. R. WALTON.
METHOD OF TESTING METALLIC TUBES.

No. 324,495. Patented Aug. 18, 1885.

Witnesses:
I. Staib
Harold Serrell

Inventors:
Frank G. Stone
William R. Walton
per Lemuel W. Serrell atty

UNITED STATES PATENT OFFICE.

FRANK G. STONE, OF NEW YORK, N. Y., AND WILLIAM R. WALTON, OF ANSONIA, CONNECTICUT, ASSIGNORS TO THE ANSONIA BRASS AND COPPER COMPANY, OF ANSONIA, CONNECTICUT.

METHOD OF TESTING METALLIC TUBES.

SPECIFICATION forming part of Letters Patent No. 324,495, dated August 18, 1885.

Application filed November 19, 1884. (No model.)

*To all whom it may concern:*

Be it known that we, FRANK G. STONE, of the city and State of New York, and WILLIAM R. WALTON, of Ansonia, in the county of New Haven and State of Connecticut, have invented an Improvement in Testing Metallic Tubes, of which the following is a specification.

Copper and brass tubes have heretofore been tested by water under pressure. In many instances the imperfections are so small that the water issuing from the same is not noticeable, and in other instances the perforation may interfere with the after usefulness of the tube, and yet be so small that water will not pass through the same. Great care has to be exercised in testing tubes, especially those that are to be used in refrigerating-machines, because the smallest leak will interfere with the vacuum or allow the escape of ether.

Our invention relates to the testing of metallic tubes of all kinds by atmospheric air or gaseous pressure within the pipe while the pipe is immersed in water, so that the smallest leak will be visible by reason of the bubbles of air rising up through the water or liquid. We have a peculiarly-constructed apparatus by which to apply the gaseous pressure to the best advantage.

Figure 1:
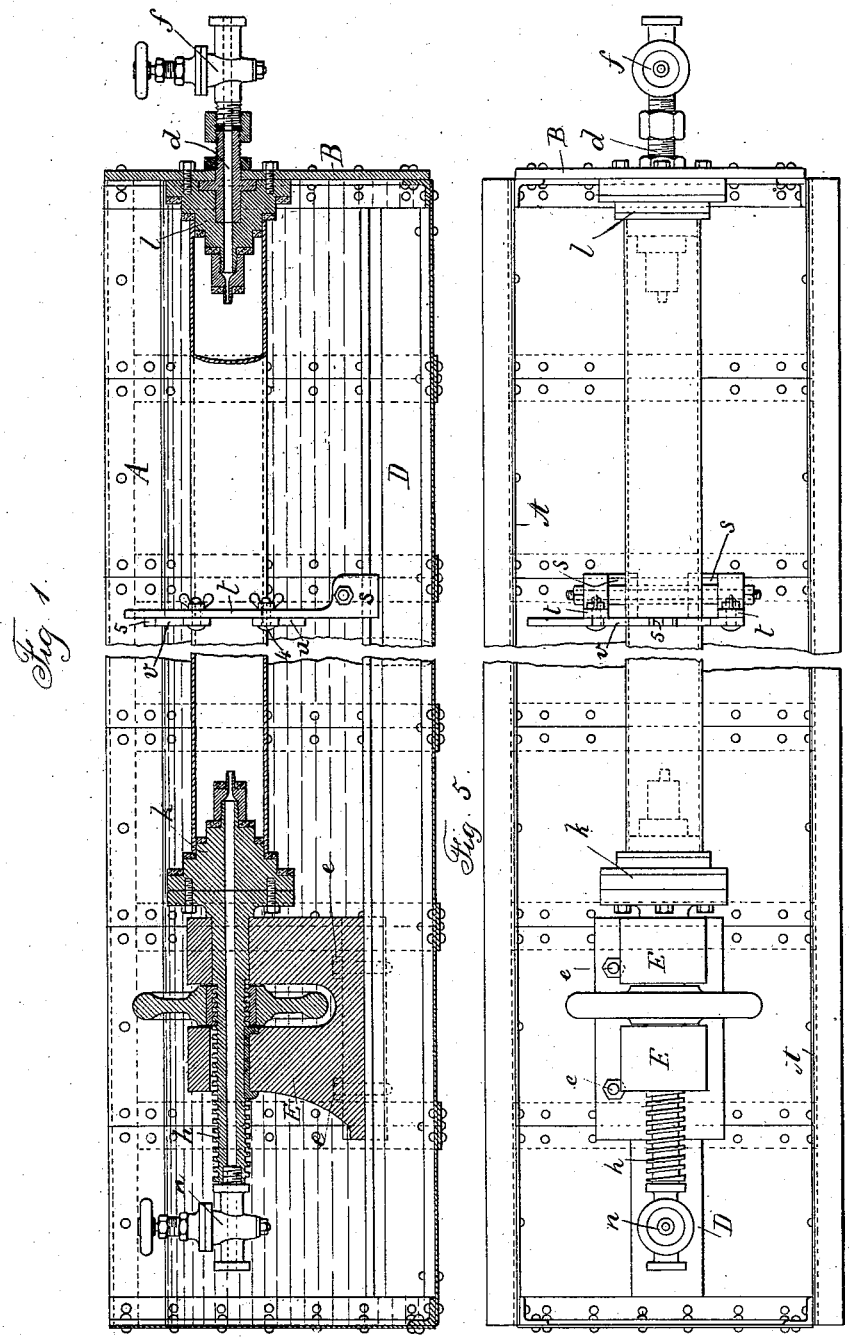
Figure 2:
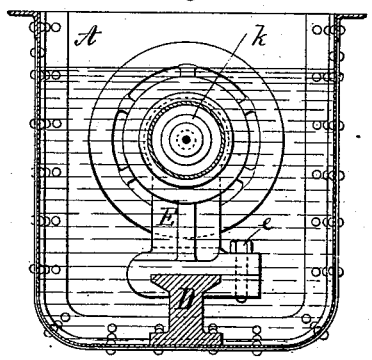
Figure 3:
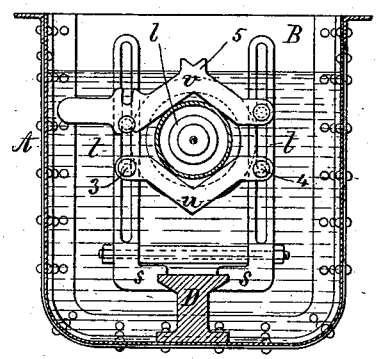
Figure 4:
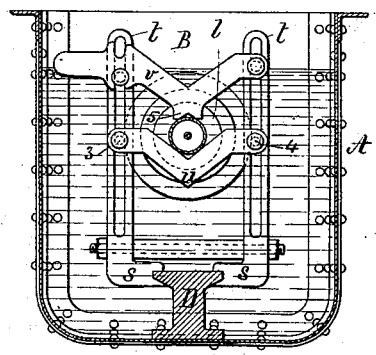

In the drawings, Figure 1 is a longitudinal section of the apparatus made use of by us. Fig. 2 is a cross-section of the same. Figs. 3 and 4 represent the intermediate supports for the tube, and Fig. 5 is a plan view of the apparatus.

The testing-trough A is to be of suitable dimensions—say about twenty-two feet long. The drawings represent the end portions. At one end of the tank A there is the rigid head B, preferably of cast-iron, through which passes the tube *d* from the air-cock *f*.

Upon the bottom of the trough A there is the guide-rail D, upon which there is a suitable sliding head, E, with clamping-screws *e*, to fasten it in the proper position on the rail D. This head E is provided with a screw, *h*, by which the stopper *k* is supported. There is a similar stopper, *l*, around the tube *d*. These stoppers *k l* may be made conical, with surfaces of india-rubber or similar material; or they may be made with cylindrical offsets of progressively-increasing diameters, with elastic rings upon their flat surfaces, the objects being to accommodate different diameters of pipe and to stop the ends of the pipe air-tight.

It is to be understood that the ends of the tubes are to be cut off smooth, and then placed between the stoppers *k l*, and the screw *h* set up to apply the power required for making tight joints at the ends of the tube that is being tested. Air is turned on, and the water that there may be within the tube is blown out by such air, the water and air escaping by preference through the tubular screw *h* and valve or cock *n;* or else the stoppers at the ends of the tube are not entirely closed until water is blown out and the air takes its place, and then the stoppers are tightened against the ends of the tubes, or the cock *n* closed, so that the confined air under a high degree of pressure may be the means of testing the strength of the tube, and for showing whether it is perfect; for should there be any perforations in the tube the air or gases escaping through the same will be easily detected, even when of the most minute character, by the bubbles rising in the water within the trough, and into which the tube is immersed.

In some instances, especially with small tubes, it is necessary to hold the tube, so that it will not bend or buckle laterally by the end pressure applied to the stoppers. To effect this object we make use of a holder that may be slipped along upon the rail D to any desired part of the trough, or two or more holding devices may be used at equal distances apart along the tube. Each holder is composed of the blocks *s*, fitting the rail D, the uprights *t*, the V-shaped bearing *u*, and the swinging clasp *v*. The uprights *t* are slotted to receive the clamping screws and nuts 3 4, that sustain the V-bearing *u*, and by which such bearing *u* may be placed in the proper position for holding the tube to be tested. The swinging clamp *v* is also adjustable to suit the particular size of tube, and where small tubes are being tested the clamp *v* may be inverted, to cause the angle of the clamp to set into the angle of the bearing, and the tube is held between the horns 5, as seen in Fig. 4.

We do not claim the testing of a can or other vessel under water by means of air or gas under pressure, as in this case the vessel has but one opening, and it is connected with the air-tubes before being introduced into the water. With metallic tubes that are open at both ends the devices that close the ends have to be pressed against the same, and any liquid within the tube driven out before testing.

We claim as our invention—

1. The method herein specified of testing metallic tubes, consisting in immersing the tube in a liquid, closing the ends, blowing out the water in the tube, and forcing air or gas under high pressure into the tube, so as to indicate any imperfection by the escape of the air or gas into the water, substantially as set forth.

2. The method herein specified of testing metallic tubes, consisting in closing the two open ends of the tubes by pressure upon yielding material, and forcing air or gas under high pressure into such tube while immersed in a liquid, substantially as set forth.

Signed by us this 17th day of November, A. D. 1884.

FRANK G. STONE.
WILLIAM R. WALTON.

Witnesses:
WILLIAM G. MOTT,
HAROLD SERRELL.